No. 878,074. PATENTED FEB. 4, 1908.
J. LATZEL.
MOTOR VEHICLE.
APPLICATION FILED JUNE 10, 1907.
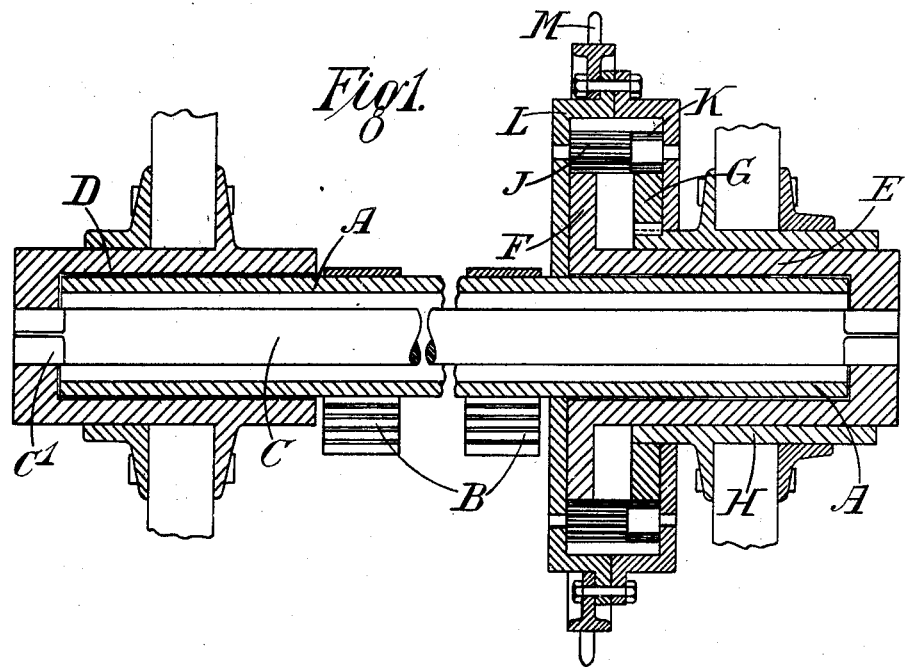
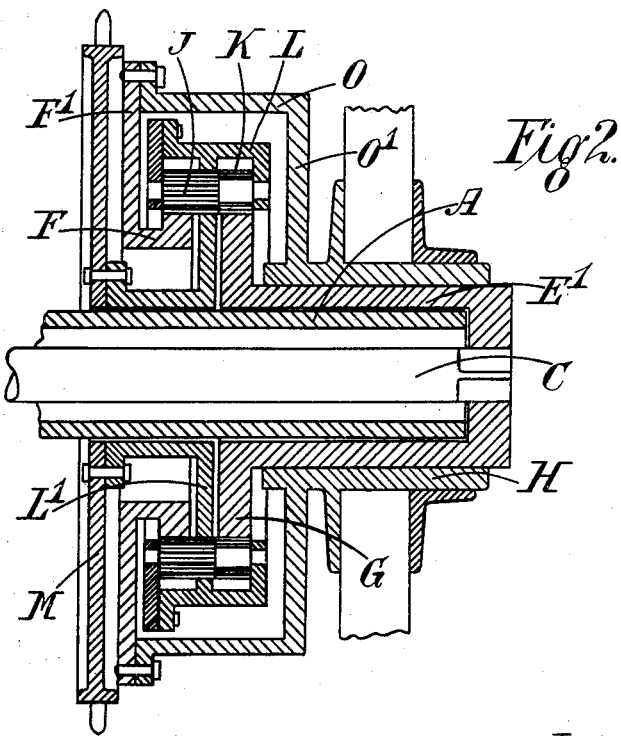
Witnesses
Inventor
Josef Latzel
per Wm E Boulter
Attorney

UNITED STATES PATENT OFFICE.

JOSEF LATZEL, OF LONDON, ENGLAND.

MOTOR-VEHICLE.

No. 878,074.

Specification of Letters Patent.

Patented Feb. 4, 1908.

Application filed June 10, 1907. Serial No. 378,242.

*To all whom it may concern:*

Be it known that I, JOSEF LATZEL, a subject of the Emperor of Austria-Hungary, and resident of c/o Disconto Gesellschaft, 53 Cornhill, London, E. C., England, have invented certain new and useful Improvements in Driving-Axles Particularly for Motor-Vehicles, of which the following is a specification.

This invention relates to driving axles of the "live" type, with the differential gear arranged between one spring and the adjacent road wheel, particularly for use on motor vehicles, and has for its object to provide a substantial construction, in which the rotating parts do not carry the load, and in which the portion of the axle which carries the load is continuous, as is also the rotating portion.

According to this invention, the load and road wheels are carried by a tubular member, in which is contained the rotating member. At one end of this latter, one road wheel is attached, while the other end is connected by a sleeve to one member of the differential gear. The other member of the differential gear is connected by a sleeve lying outside that just mentioned, to the other road wheel. In this way a form of "continuous" axle is obtained, which is naturally stronger than the construction in which the axle is divided, and carries the load, as is commonly the case.

The accompanying drawings show diagrammatically how this invention may be carried into effect.

Figure 1 is a longitudinal section of one form of axle constructed in accordance with this invention, while Fig. 2 is a part sectional view showing a modified form of axle.

In the construction illustrated in Fig. 1, the tubular part A carries the load, for which purpose the vehicle springs B are attached to this tube. Arranged within the tube A is an undivided rotating shaft C. To the left hand end of the rotating shaft C is attached one road wheel hub D. The method by which this is attached to the shaft forms no part of the invention, so that this and many other constructional details are shown merely diagrammatically. In this case the connection is shown as a square $C^1$ on the shaft, engaging a similar hole in the hub. To the other end of the rotating shaft C is fixed a sleeve E the other end of which carries one of the differential gear members F. The other gear member G is connected to the right hand wheel hub H which lies outside the sleeve E, and these members F and G are engaged by the differential pinions J and K journaled in casing L as usual. On this casing L is mounted the driven gear member, which may be a chain sprocket M. Obviously, suitable bearings and bushes are arranged where necessary.

In operation, it will be seen that the drive transmitted to the driven chain sprocket M and casing L passes by way of the differential pinions J and K to the gear members F and G, as usual. The first of these transmits power, by means of the sleeve E, to the right hand end of the tubular axle, and thence to the rotating shaft C, and thus to the hub D and left hand road wheel, while the other gear member drives direct on to the hub H, and right hand road wheel.

It will be seen that the load is supported on the tubular member A, which is undivided and continuous throughout the width of the vehicle.

The construction shown in Fig. 2 is similar to that shown in Fig. 1 with the exception that the gear members F and G now drive on to the opposite road wheels from which they drove in the previous construction. In this case the chain sprocket M is connected to the differential gear casing L by means of a web $L^1$. The pinions J and K mesh with the gear members F and G as before, but in this case the gear wheel G is connected with the sleeve $E^1$ which is fixed to the rotating shaft C, at the other end of which the left hand wheel hub is fixed. The other gear member F is connected to a plate $F^1$ to which is attached a drum O, the web $O^1$ of which is attached to the right hand wheel hub H. The operation is the same as in the previous construction, and the results obtained are similar in that the tubular member carries the load, and it, and the rotating member C, are continuous throughout the width of the vehicle. Obviously, in place of a chain sprocket, any other driving member may be employed, and this, and the driving pinion, may be contained within a suitable casing.

What I claim as my invention, and desire to secure by Letters Patent of the United States, is:—

1. In combination, a driven gear member, an undivided stationary supporting axle member road wheels supported thereon and a continuous undivided rotating axle member connected to the driven gear member and to the road wheels substantially as set forth.

2. In combination, a driven gear member, an undivided stationary supporting axle member, road wheels supported thereon, a differential gear supported thereon and connected to the driven gear member and a continuous undivided rotating axle member connected to the differential gear and to the road wheels, substantially as set forth.

3. In combination, an undivided tubular stationary supporting axle member, a continuous undivided rotating axle member contained therein, a differential gear supported thereon, one road wheel supported on said tubular axle member and connected to the rotating axle member, a sleeve mounted on the tubular axle member and connected to the rotating axle member and to the differential gear, one road wheel mounted on said sleeve and connected to said differential gear and a driven gear member connected to said differential gear, substantially as set forth.

In testimony whereof I have signed my name to this specification in the presence of two subscribing witnesses.

JOSEF LATZEL.

Witnesses:
HARRY G. GRIDGE,
HERBERT BURRAGE.